(12) United States Patent
Karlsson

(10) Patent No.: US 7,966,295 B2
(45) Date of Patent: Jun. 21, 2011

(54) SYSTEM AND METHOD OF MIRRORING A DATABASE TO A PLURALITY OF SUBSCRIBERS

(75) Inventor: Tobias Karlsson, Raleigh, NC (US)

(73) Assignee: Teefonaktiebolaget L M Ericsson (Publ), Stockholm (SE)

( * ) Notice: Subject to any disclaimer, the term of this patent is extended or adjusted under 35 U.S.C. 154(b) by 784 days.

(21) Appl. No.: 11/869,821

(22) Filed: Oct. 10, 2007

(65) Prior Publication Data

US 2009/0100075 A1    Apr. 16, 2009

(51) Int. Cl.
*G06F 17/30* (2006.01)

(52) U.S. Cl. .......... 707/655; 707/999.204; 709/203; 709/219

(58) Field of Classification Search ............. 707/605, 707/999.204, 655; 709/203, 219
See application file for complete search history.

(56) References Cited

U.S. PATENT DOCUMENTS

| | | | |
|---|---|---|---|
| 6,651,099 B1* | 11/2003 | Dietz et al. | 709/224 |
| 7,317,699 B2* | 1/2008 | Godfrey et al. | 370/328 |
| 7,584,225 B2* | 9/2009 | Jiang et al. | 1/1 |
| 2003/0208693 A1* | 11/2003 | Yoshida | 713/201 |
| 2005/0055595 A1* | 3/2005 | Frazer et al. | 713/400 |

* cited by examiner

*Primary Examiner* — Apu M Mofiz
*Assistant Examiner* — Monica M Pyo

(57) ABSTRACT

A system and method for updating a plurality of subscribers served by a server. The system includes a server and a database coupled to the server. The database has link elements organized into a linked list. The link elements include a plurality of data link elements associated with data entries. Additionally, the link elements include at least one marker link element not associated with any data entry. The subscriber communicates with the server. The server steps through the plurality of link elements for updated entries, determines if each stepped link element is a data link element, formats the updated data associated with the data link element and appends the formatted data to an update message. The update message, at a specified time, is sent to at least one subscriber. In addition, a marker link element is inserted at a specified position in the linked list to indicate update of the linked list.

21 Claims, 9 Drawing Sheets

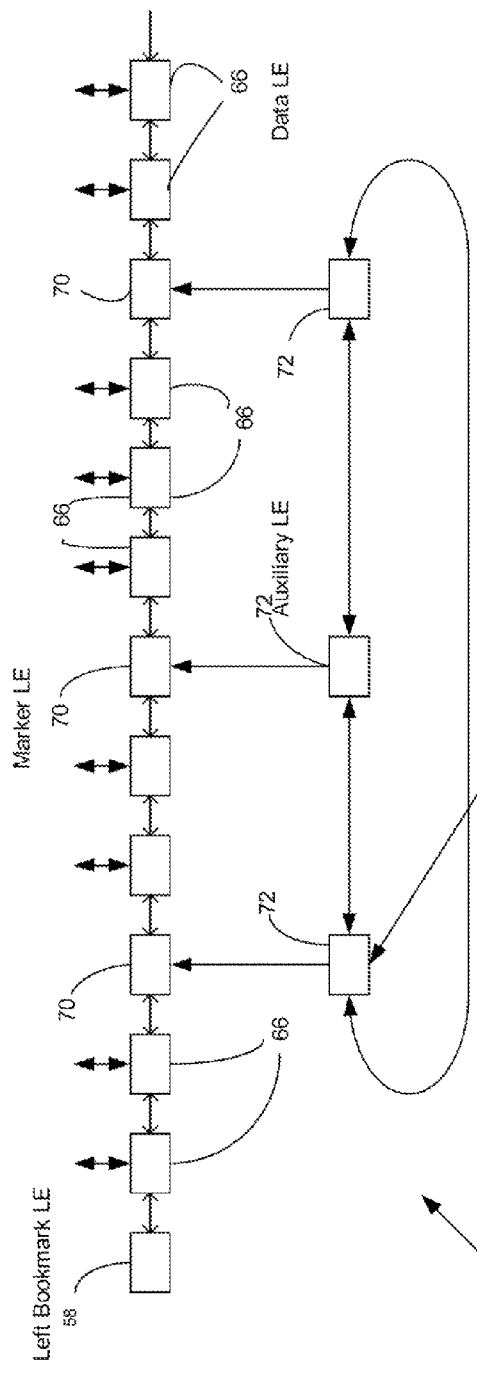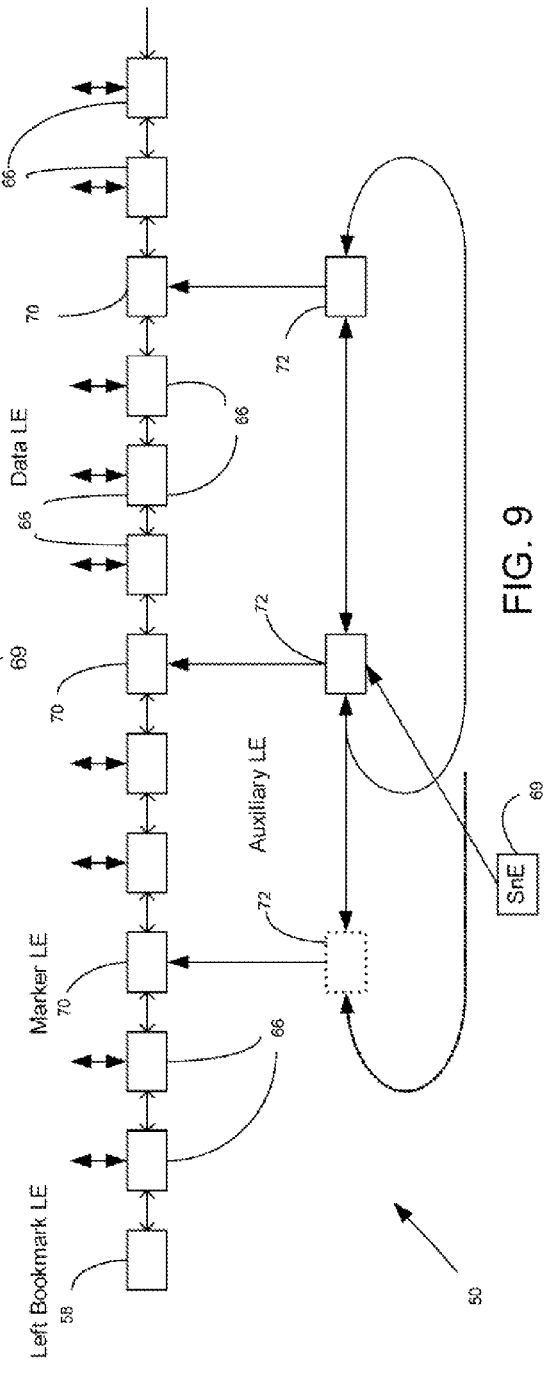

SYSTEM AND METHOD OF MIRRORING A DATABASE TO A PLURALITY OF SUBSCRIBERS

CROSS-REFERENCE TO RELATED APPLICATIONS

NOT APPLICABLE

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND OF THE INVENTION

The present invention relates to databases. More particularly, and not by way of limitation, the present invention is directed to a system and method for mirroring a database to a large number of subscribers or clients.

In many networks, there are servers which provide database services to a wide range of subscribers or clients. Currently, when an update is conducted upon a database, a large amount of resources are needed within the server to provide updates to each subscriber. Additionally, when a subscriber is added to a network serviced by the server, additionally resources are required to update the database and distribute the information to all the subscribers. A system and method are needed which enable updates to be made to a server database while limiting the resources needed to provide the update to one or more subscribers.

It would be advantageous to have a system and method for updating a server database which allows the database to be updated while simultaneously updating the plurality of subscribers. In addition, it would be advantageous for subscribers to be added to the system without any disruption in the sessions already established between the server and the existing subscribers. The present invention provides such a system and method.

BRIEF SUMMARY OF THE INVENTION

The present invention is a system and method for updating a plurality of subscribers served by a server. In one aspect, the present invention is directed to a system for updating subscribers. The system includes a server and a database coupled to the server. The database has link elements organized into a linked list. The link elements include a plurality of data link elements associated with data entries. Additionally, the link elements include at least one marker link element not associated with any data entry. The subscriber communicates with the server. The server steps through the plurality of link elements for updated entries, determines if each stepped link element is a data link element, formats the updated data associated with the data link element and appends the formatted data to an update message. The update message, at a specified time, is sent to at least one subscriber. In addition, a marker link element is inserted at a specified position in the linked list to indicate update of the linked list.

In another aspect, the present invention is directed to a method of updating a subscriber communicating with a server. The server is associated with a database storing a plurality of data entries. The method begins by organizing the database into a link list having a plurality of link elements. The plurality of link elements includes a plurality of data link elements associated with data entries and at least one marker link element not associated with any data entry. The method also includes the step of stepping through the linked list by the server for updated entries. The server determines if each stepped link element is a data link element, formats any updated data associated with the determined data link element and appends the formatted data into an update message. The update message is sent at a specified time to at least one subscriber communicating with the server. A marker link element is inserted at a specified position in the linked list to indicate update of the linked list.

In yet another aspect, the present invention is directed to a computer program embodied on a computer readable medium for updating a subscriber communicating with a server. The server is associated with a database storing a plurality of data entries. The computing program includes a code segment for organizing the database having a plurality of link elements into a linked list. The plurality of link elements includes a plurality of data link elements associated with data entries and at least one marker link element not associated with any data entry. The computer program also includes a code segment for stepping through the linked list for updated data by the server and a code segment for determining if each stepped link element is a data link element. The computer program also includes a code segment for formatting updated data associated with the determined data link element and appending the formatted data into an update message. A code segment is then utilized for sending the update message at a specified time to at least one subscriber communicating with the server. In addition, the computer program includes a code segment for inserting a marker link element at a specified position in the linked list to indicate update of the linked list.

BRIEF DESCRIPTION OF THE SEVERAL VIEWS OF THE DRAWING

In the following, the essential features of the invention will be described in detail by showing preferred embodiments, with reference to the attached figures in which:

FIG. 8 is a simplified block diagram of the linked list illustrating an update message creation with more data pending;

FIG. 9 is a simplified block diagram of the linked list illustrating receipt of acknowledgements;

DETAILED DESCRIPTION OF THE INVENTION

Figure 1:
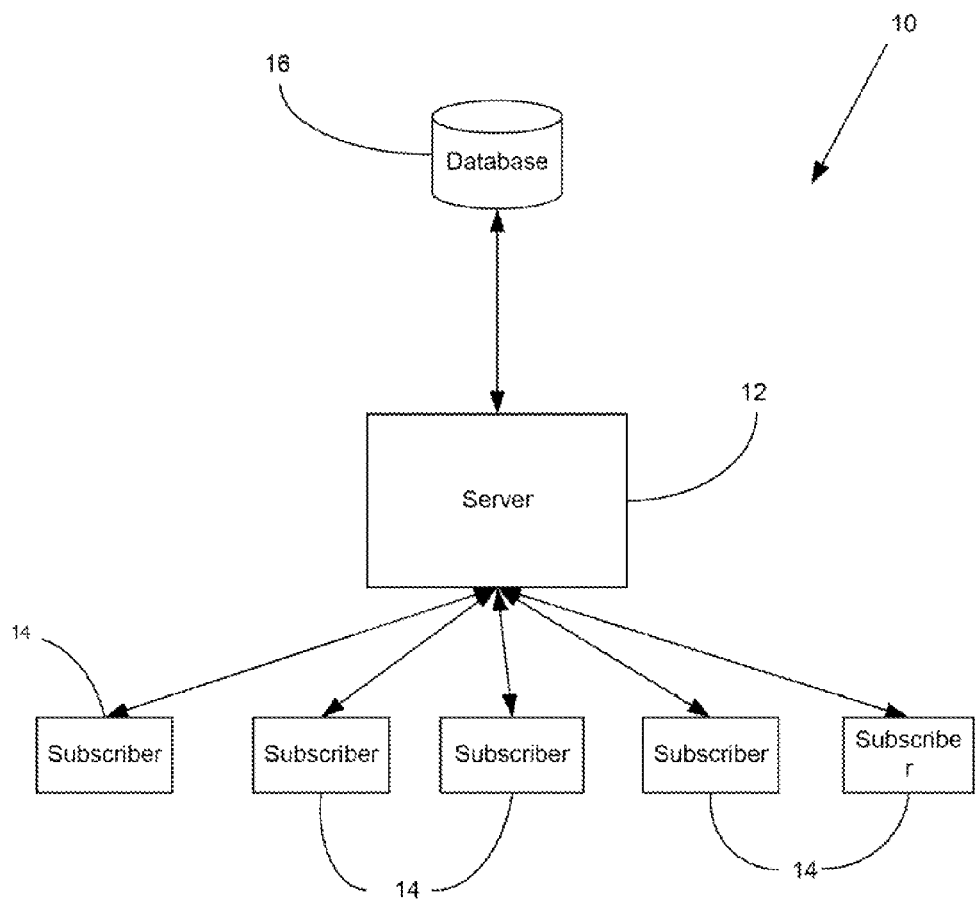
FIG. 1 is a simplified block diagram of a filtering system having a filtering stage apparatus in a firewall in the preferred embodiment of the present invention.

The present invention is a database subscription protocol capable of mirroring a master database to a large number of subscribers (or clients). FIG. 1 is a simplified block diagram of a system 10 in the preferred embodiment of the present invention. The system includes a server 12 serving a plurality of subscribers (clients) 14. The system also includes a database 16 communicating with the server 12. The server 12 communicates with the plurality of subscribers 14 via a message or datagram transport medium. The datagrams, if delivered, must be delivered intact. The protocol of the present invention does not require in-order delivery of datagrams. The protocol does not require tight requirements on datagram delivery time (network latency). The protocol may be carried by the User Datagram Protocol (UDP: IETF RFC 768) or any similar datagram protocol.

To allow the protocol to operate properly, the database 16 must be capable of being divided into relatively independent entries. Specifically, each entry preferably includes a unique identity part (the key) and a container part (the data). For example, in a company's customer database, the key may be the customer number and the data may be information about the customer. In another example, in a prefix database of an Internet router, some of the router implementations must be distributed to multiple instances via a message medium. Another example is the prefix database of an Internet router, which in most larger implementations need to be distributed between sub-components of the router. In such a database, the prefix is the key and the information identifying the forwarding path is the data.

In the customer database example, customer data may be further divided into smaller entries (e.g. an entry for the customer address, an entry for the customer phone number, etc.). The key in this case contains both the customer number and an identifier for identifying the type of information about the customer.

In the protocol of the present invention, while an entry of the server database 16 may transition between multiple states A-B-C-D-E, a subscriber 14 is not guaranteed to see all those states. The subscriber may see any possible subset of the states, although always in the same order. For example, assuming that a subscriber data entry at the end reaches the stable state E, the server database may go through state sequences such as A-E, A-C-E, A-B-D-E, A-B-C-D-E, B-E, B-D-E, E, etc. It is also important to note that the subscriber may receive the same entry multiple times.

Figure 2:
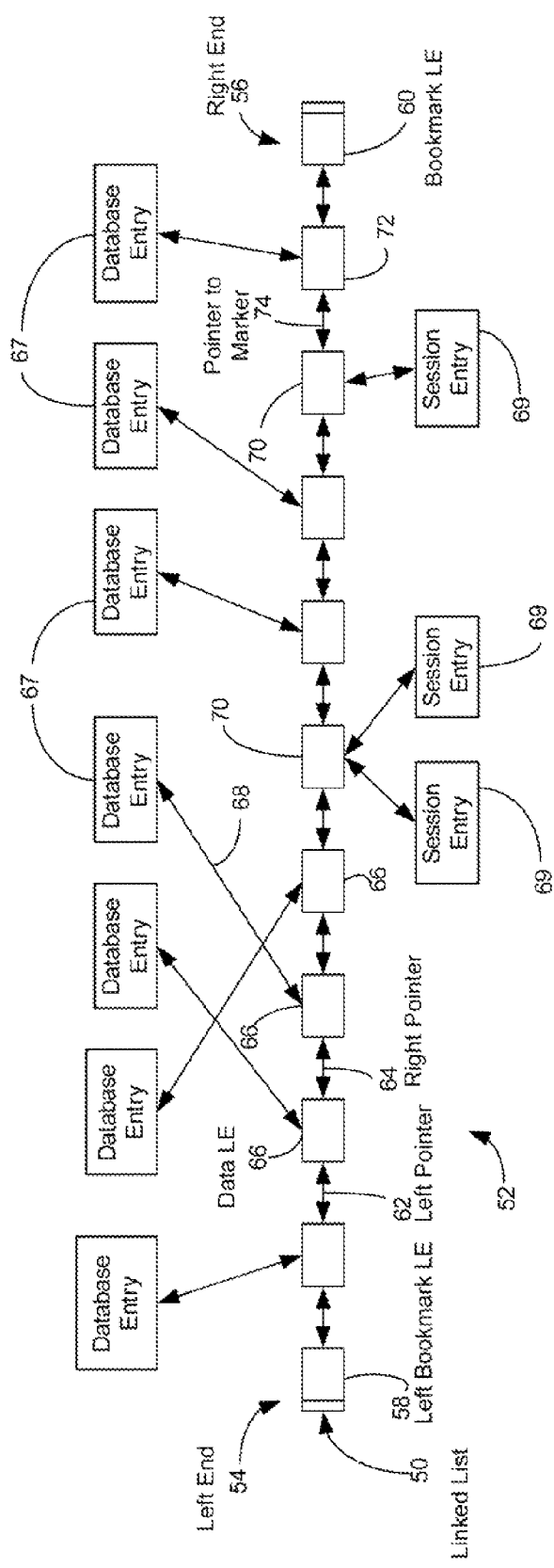
FIG. 2 is a simplified block diagram illustrating a server linked list in the preferred embodiment of the present invention.

FIG. 2 is a simplified block diagram illustrating a server linked list 50 in the preferred embodiment of the present invention. All entries of the database, when stored in the server, must be referenced by one of a plurality of link elements (LEs) 52, where the LEs are organized in the linked list 50. In FIG. 2, the linked list is configured from left to right. However, it should be understood that the linked list may be configured in any sequential configuration (e.g., right to left, up to down, etc.). As depicted in FIG. 2, the linked list includes a left end 54 and a right end 56. At both ends are fixed LEs not associated with any database entry. These end LEs are termed bookmark LEs 58 and 60.

Each LE 52 includes, at a minimum, a type field, a left pointer 62 and a right pointer 64. The left pointer points at the LE to the left, the right pointer points at the LE to the right. An LE that is associated with a database entry 67 is referred to as a data LE 66. The data LEs also contain an object pointer 68 (pointing at the database entry). Additionally, if needed, the data LE may include a data entry type field specifying the type of the database object if multiple types are supported.

Each session entry 69 entered by the subscriber 14 with the server 12 is always associated with at least one marker LE 70, but it may be associated with multiple marker LEs 70, as discussed below. A session will not insert a marker LE next to another marker LE. Rather, the protocol instead links to the same marker LE and increments the reference counter of that marker LE. This does not preclude that two marker LEs may end up next to each other in the linked list. In order to allow multiple sessions to share a marker LE, the marker LE contains a reference counter specifying how many sessions are currently linking to the marker LE. Another type of LE is an auxiliary LE 72. The auxiliary LE 72 stores, in addition to the common fields, a pointer 74 to a marker LE 70.

Figure 3C:
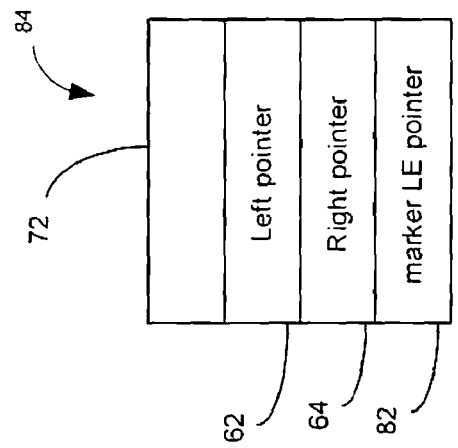
FIG. 3C is a simplified block diagram of the contents of the auxiliary LE.
Figure 3B:
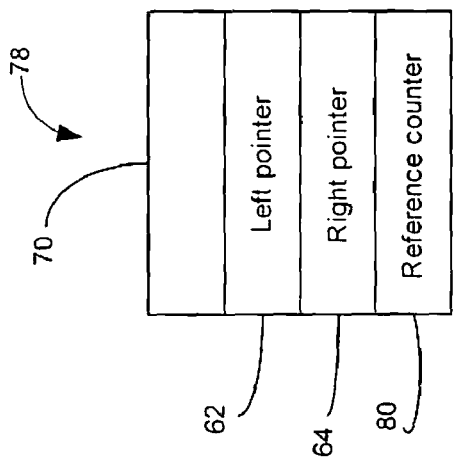
FIG. 3B is a simplified block diagram of the contents of the marker LE.
Figure 3A:
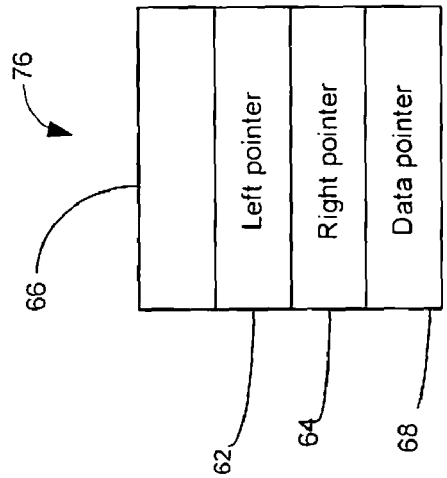
FIG. 3A is a simplified block diagram of the contents of the data LE.

FIG. 3A is a simplified block diagram of the contents 76 of the data LE 66. The data LE includes the left pointer 62, the right pointer 64, and the object pointer 68. FIG. 3B is a simplified block diagram of the contents 78 of the marker LE 70. The marker LE includes the left pointer, the right pointer and a reference counter 80. FIG. 3C is a simplified block diagram of the contents 84 of the auxiliary LE 72. The auxiliary LE includes the left pointer, the right pointer and a marker LE pointer 82.

As database entries are created, their associated LE 52 (via pointers) must be inserted at the right-most position of the linked list (to the left of the right bookmark LE). Similarly, if a database entry is updated, its associated LE must be moved to the right-most position. By following this simple algorithm, each session is capable of tracking the information it needs to send to the subscriber 14. As the session is setup (first time or restarted), the LE associated with the updated database entry is inserted at the left-most position (to the right of the left bookmark LE). As the session receives acknowledgements for updates, the LE is moved past the LEs associated with the acknowledged data. With this scheme, there is little overhead per session for keeping track of what has been passed to the subscriber and what has not passed.

Each session with a subscriber 14 is associated with the session entry (SnE) 69. The session entry contains several elements at a minimum. First, "subscriber information" is provided. If the message medium is User Datagram Protocol/Internet Protocol (UDP/IP), then this subscriber information may be an IP address and the UDP port number of the subscriber. Another optional element is a "session handle," which is a server-selected value that may be composed in such a way that makes it possible for the server to quickly locate the subscriber. Another element is a "session sequence number" (SSN), which is an unsigned wrapping integer representing the last update message for which an acknowledgement was received. This unsigned wrapping integer is assumed be a 32-bit unsigned integer. However, the wrapping integer may utilize any format. Still another element is a "received bitmap", which is a copy of a bitmap received from a subscriber of future update messages that have been received. Additionally, "state information" is provided which indicates the current state of the session (e.g., IDLE, READY, ACTIVE, WAITING, or DORMANT). Another element of the session entry is "maximum pending messages," which is the maximum number of pending messages. Another element is "resend offset". If non-zero, this element indicates that updates are being resent to the subscriber. The resend offset plus the SSN indicates the sequence number of the previously resent update message. "Time slot integer" is another element if the session is waiting for something and it needs to time out at some point. This element specifies when to time out. "Next and previous session pointers" is another element which, depending on the state of a session, the session will be linked into a linked lists corresponding to that state. The session entry will also include the "LE pointer" which points either at a marker LE 70 or at an auxiliary LE 72.

As a message is received from a subscriber, the message is associated with a session entry 69. Each session is always associated (either directly or via an auxiliary LE) with an LE in the linked list 50.

Figure 4:
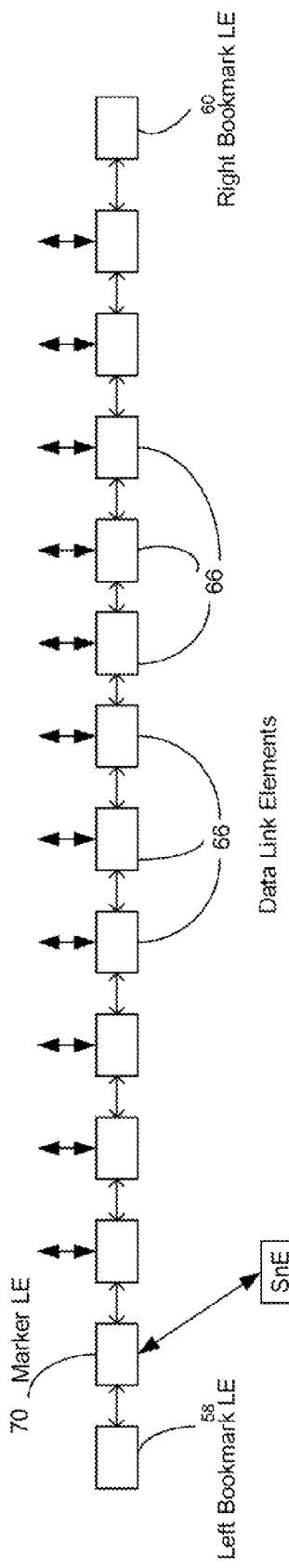
FIG. 4 is a simplified block diagram illustrating the linked list in a session start state.

The present invention provides an algorithm which the server 12 follows when sending updates to a subscriber 14. FIG. 4 is a simplified block diagram illustrating the linked list 50 in a session start state. As a session is setup (created or restarted), a marker LE 70 is inserted to the right of the left bookmark LE 58 and the session is left in a "READY" state. From here, the server 12 incrementally generates messages to the subscriber with information about the database entries referenced by all data LEs between the marker LE and the right bookmark LE 60.

Figure 5:
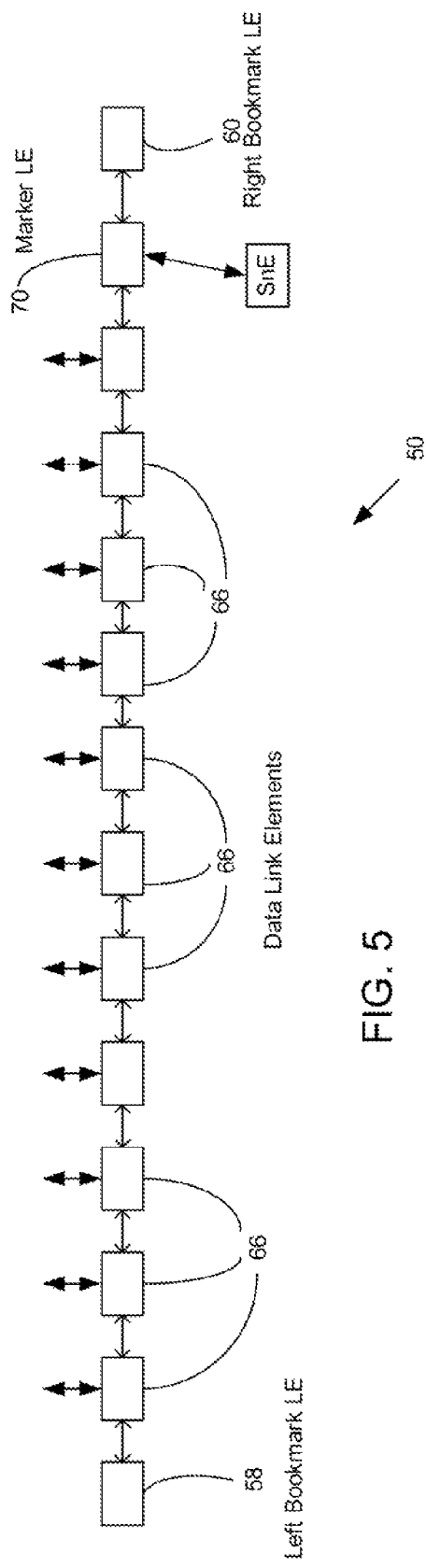
FIG. 5 is a simplified block diagram of the linked list in a session idle state.

FIG. 5 is a simplified block diagram of the linked list 50 in a session "IDLE" state. A session is idle when the subscriber is fully up-to-date with the server database 16. In this state, there are no data LEs 66 to the right of the associated marker LE 70 of the session. This is the state that the server algorithm is always striving to reach. Any update to the database cause the session to leave this state.

Figure 6:
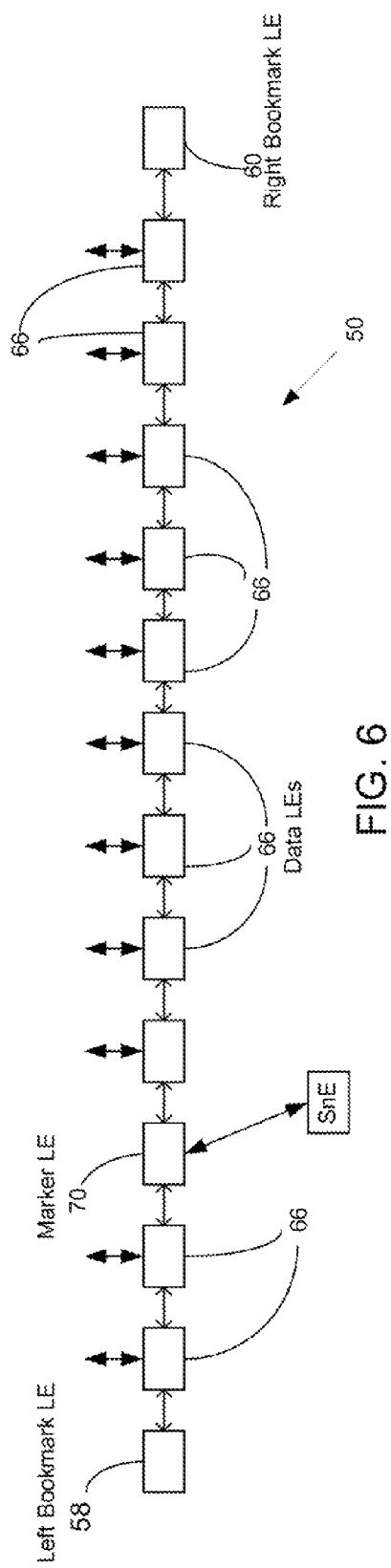
FIG. 6 is a simplified block diagram of the linked list with an update of the database.

FIG. 6 is a simplified block diagram of the linked list 50 with an update of the database 16. FIG. 6 illustrates the scenario when a large number of database entries are added or updated. The session has been moved to being in its ready state, but has not yet had the time to react to it. This is somewhat similar to when a session is first setup and its associated marker LE is placed at the far left.

Figure 7:
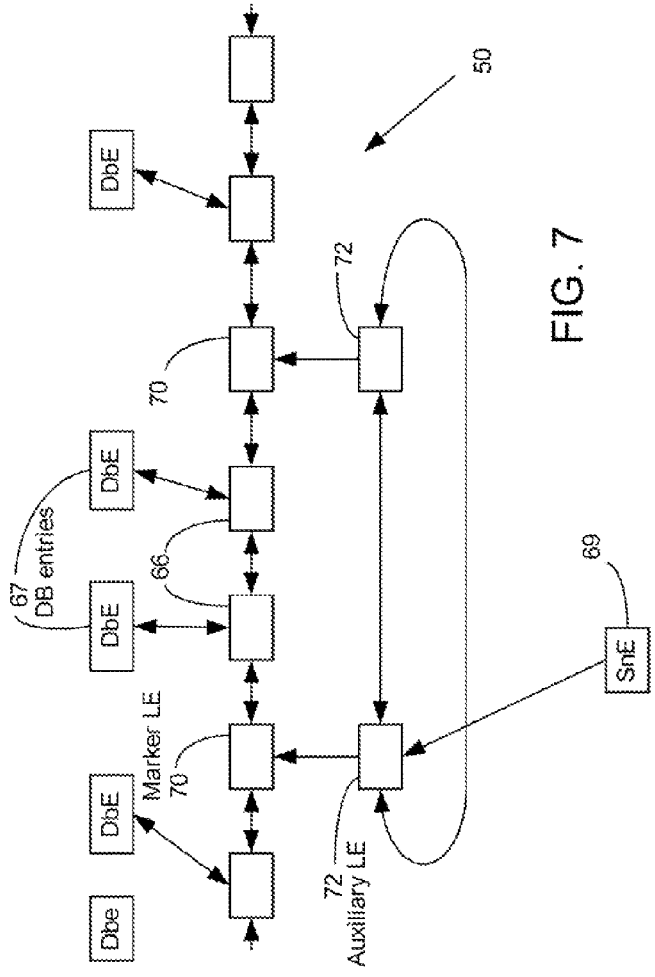
FIG. 7 is a simplified block diagram of the linked list illustrating an update message creation.

FIG. 7 is a simplified block diagram of the linked list 50 illustrating an update message creation. As the program flow reaches the session in question, the session creates an update message. Starting at the marker LE 70, the session steps one LE at a time (to the right) in the linked list 50 and copies as many database entries 67 into the message as there is space. To the right of the last data LE, a marker LE (or share if possible) is inserted. In addition, two auxiliary LEs 72 are allocated and linked together as shown in FIG. 7. The sequence number of the update message is one (1) plus the sequence number stored in the session entry 69. Auxiliary LEs 72 are utilized since the session may be associated with more marker LEs than pointers are available for allocation in the session entry. There will be one marker LE per pending update message (except for shared marker LEs) as well as the left-most marker LE of the session.

FIG. 8 is a simplified block diagram of the linked list 50 illustrating an update message creation with more data pending. If there is more data pending (which is the case in this example) an acknowledgement from the subscriber is not necessary prior to sending another update message. By simply continually "walking" (sequentially check) the data LEs to the right of the right-most marker LE, another update message is created. This process can be repeated any number of times, thus allowing for any number of pending messages per session.

FIG. 9 is a simplified block diagram of the linked list 50 illustrating receipt of acknowledgements. If an acknowledgement is received for an update message, the sequence number of the session is stepped to the sequence number of the acknowledgement. In addition, the marker to which an auxiliary LE 72 is associated to the respective messages is removed. The LE pointer of the session is moved so that it always points at the left-most auxiliary LE. If there is only one auxiliary LE left (currently no pending update messages), the auxiliary LE is removed and the LE pointer of the session entry points at the marker LE.

If an acknowledgement is not received and the session is timed out, the information must be resent. The message is then recreated with all the database entries pointing at the data LEs 66 that are between the marker LEs 70 that correspond to the original update message. Any other update message may also be resent by locating the two marker LEs associated with a pending update message. A recreated update message may only contain a subset of what the original message contained. This occurs if there has been an update to any of the database entries of the original message. Any entries missing in this update message may then be part of a later update message (and therein containing the updated data).

Figure 10:
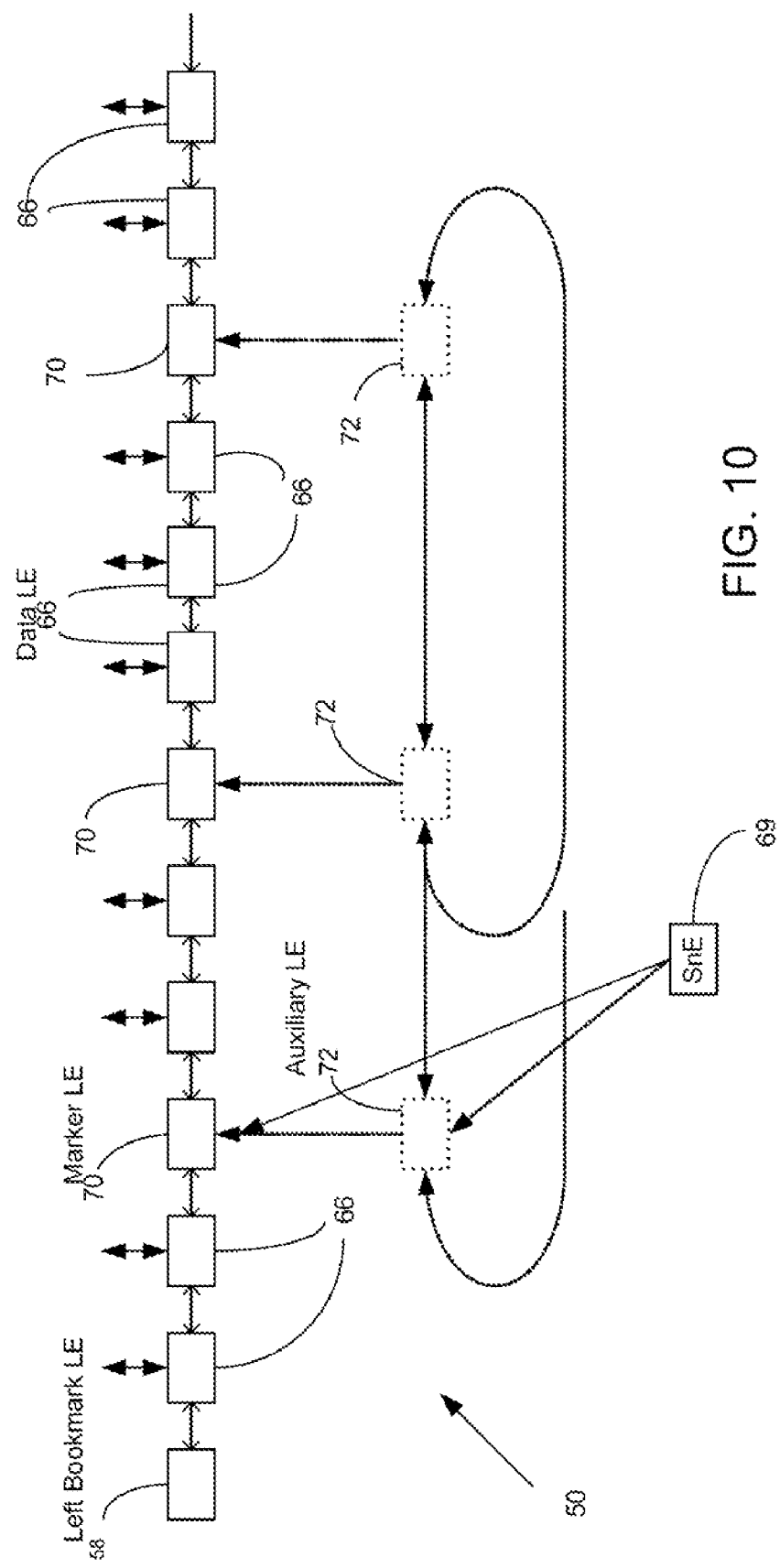
FIG. 10 is a simplified block diagram of the linked list when the session is moved to the dormant state.

FIG. 10 is a simplified block diagram of the linked list 50 when the session is moved to a "dormant" state. If there has been no progress with a subscriber 14, the session enters a dormant state. In the dormant state, unnecessary resources are released, such as auxiliary LEs 72 and extra marker LEs 70. In this state, all but the left-most marker LE are released. Additionally, all auxiliary LEs 72 are released and the LE pointer of the session entry is moved to point at the left-most marker LE as shown in FIG. 10.

There are several general session characteristics. All sequence numbers of the session are wrapping unsigned integers of a uniform size (e.g., 32 bits). All comparisons with sequence numbers must be done so that the integers can safely wrap. For example, if the size of all sequence numbers is N bits, then the sequence number X is considered greater than sequence number Y if and only if $((2^N+X-Y) \mod 2^N)$ is in the range $1 \ldots (2^{N-1}-1)$.

In the preferred embodiment of the present invention, to facilitate simple implementation of the present invention, or if the implementation supports thousands or millions of sessions, only one pending update message is allowed per session at a time. A disadvantage with this embodiment is that the bandwidth is limited to a single updated subscriber. The protocol may support multiple update messages to be sent from the server 12 to the subscriber 14 before an acknowledgement is expected.

In addition the server 12 may re-transmit update messages if no acknowledgement is received within a specific time. This time is called the "acknowledgement time out" and may, in a simple embodiment of the present invention, be set to a fixed value for all sessions. However in an alternate embodiment of the present invention, the time may be dynamically set per session by any conceivable algorithm.

In the preferred embodiment, a maximum message size is specified. In this embodiment an assumption of how large messages the datagram medium can transfer is specified as well as a fixed configurable or hard-coded maximum for all sessions. However, in alternate embodiments of the present invention, more elaborate implementations may be utilized. For example, with the Internet Protocol (IP), the network may generate Internet Control Message Protocol (ICMP) messages back to the server informing the server if a datagram was too large for some part of the network. This information could then be stored and maintained in the server per session.

Sessions on the server 12 may exist in one of various states. To support a large number of sessions and for the server 12 to easily find those sessions that are due for some kind of action, the sessions are organized into linked lists (preferably one linked list per session state). Thus, the server knows what sessions need attention and which ones do not. It also makes it simple to move sessions in bulk, which may be needed when all idle sessions need to be moved to the ready state. However, the session linked lists are not required for this protocol to work and are unnecessary in an embodiment with very few sessions. In this situation, the server may periodically scan all existing sessions to determine if an action must be conducted.

In a few session states, the session may need to time out if no other event happens. Rather than assigning a timer to each session, the state's linked list may be divided into a whole calendar of linked lists. For example, for a specific state, the longest time-out is less than a minute and if a 100 ms precision of the time-out is sufficient, then the calendar may consist of 600 'time slot' linked lists (1 min/100 ms) each representing a 100 ms interval. The granularity of the calendar would then be 100 ms. As a session transitions to a state with an associated time-out, the session may then be linked into the linked list corresponding to the time when the time-out should trigger. If another event happens in the session, the session may be removed from the calendar link list thereby implicitly de-activating the time-out. The two states that might require a calendar are the "wait" state and the "dormant" state. In one embodiment utilizing only one linked list, a search may be periodically conducted over the entire list for timed-out sessions.

A session is in the idle state if all update messages to the subscriber have been acknowledged and there are no new updates to be sent. In this state there are no data LEs 66 on the right side of the session's associated marker LE 70.

All idle sessions are moved to the ready state upon an update performed for any entry of the database (i.e., any time a data LE 66 is moved to the right-most position (left of the bookmark LE). This is an intermediate state between idle and active (or dormant and active). In one embodiment, the number of sessions may be limited in the active and wait states. Sessions in the ready state may be regarded as waiting to be admitted to the active/wait states.

Sessions which are capable of sending more update messages to their respective subscribers are in active state. In one embodiment, a session may allow for N outstanding updates to a subscriber. The session is in an active state as long as there are less than N outstanding updates. If the session reaches N, it may transition to the waiting state. In another alternate embodiment, the session is served round-robin. However, in a more elaborate embodiment, the packet rate or bit rate of a session may be bounded (shaped). In this embodiment, a time-slot calendar may be utilized similar to that utilized in the wait state described below.

A session is in the wait state if the maximum allowed pending messages specified has been reached. The server may not send out any more messages for this session. However, after some time-out period, the server must retransmit update messages according to previously described algorithms. Since sessions in the wait state are waiting for a time-out, unless cut short by some event, an embodiment supporting more than a few sessions is preferably organized in a calendar.

A session is moved to the dormant state if no progress has been made for a specified time period in the wait state. Information about pending messages is deleted in order to minimize the footprint of the session. In one embodiment sessions may be allowed to be dormant indefinitely or, alternatively, deleted after a specified period of time. The subscriber 14, the server 12, may one or both be responsible for reviving the session from the dormant state. If the server is partly or fully responsible for this, the server preferably periodically sends an empty update message to the subscriber. If dormant sessions either need to periodically send empty updates (to wake up the session) or if the sessions need to expire after some time of inactivity, the dormant sessions are organized into a calendar. Upon receipt of an acknowledgement message, a dormant session is moved to the ready state. If the sequence number of the acknowledgement is somewhat higher (modulo $2^{32}$), it must be adapted by the server. This is necessary since, before the server and subscriber lose connectivity, updates may have been received by the subscriber that the server did not receive acknowledgements for. The action of copying the subscriber sequence number to the server is inconsequential. No data is lost, but some data might be retransmitted to the subscriber.

Figure 11:
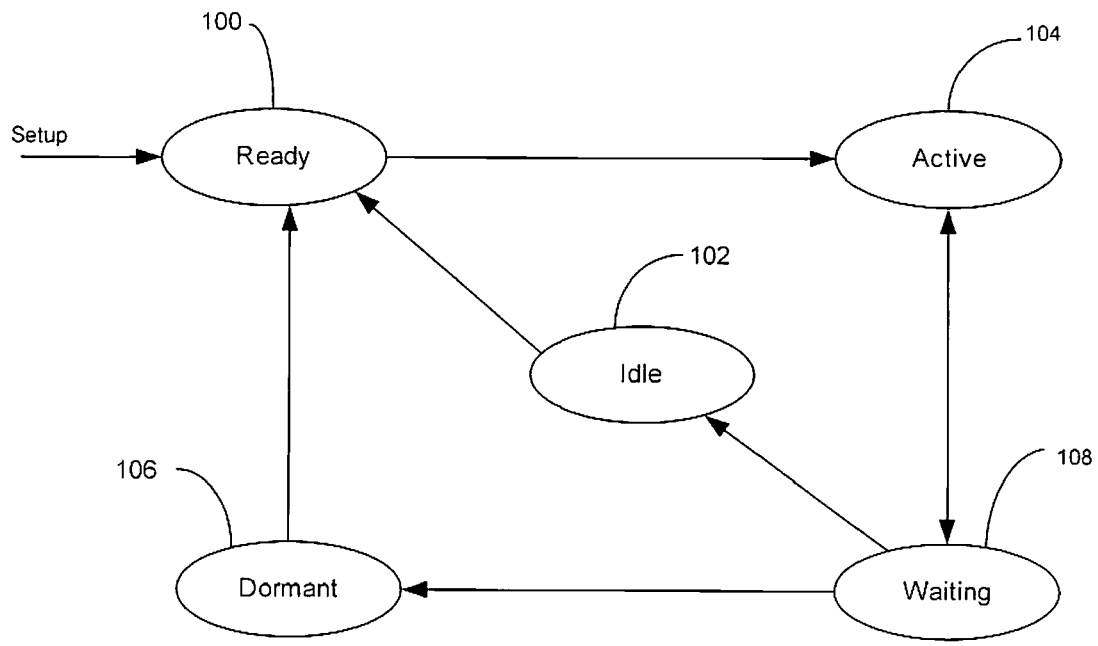
FIG. 11 is a simplified block diagram of the session states.

FIG. 11 is a simplified block diagram of the session states. The session states includes the ready state 100, the idle state 102, the active state 104 the dormant state 106 and the waiting state 108.

In the preferred embodiment of the present invention, the messages includes two fields: version 230 (to be future safe); and type 232 (an integer identifying the purpose and format of the message). A set of message types are needed in order to setup and maintain a connection (see FIG. 12).

A connection request message is sent from the subscriber to request a connection setup. The server preferably responds with a connection setup message. This message contains a session handle that for a new connection is preferably left at '0', but may, when restarting a session, be used to indicate to the server what session handle was previously used with the subscriber. Independent of the value and validity of the session handle, the server preferably responds with a connection setup message with the same or a different session handle. The server preferably removes or reuses the session referred to by the session handle in the connection request message if the check of the underlying protocol passes (port number matches).

A connection setup message is sent by the server, either as a response to a connection request message from a subscriber or unsolicited if the server is the one initiating the connection. This message contains a session handle and a start sequence number. The update sequence number of the first update message is preferably the start sequence number plus one. The start sequence number may be set to any value. If the subscriber already had a session with the server with the identical session handle, then all entries in the subscriber database are preferably either immediately removed, or at least marked for later removal. Any cached update messages in the subscriber are purged.

A disconnect message may be sent by either the server 12 or the subscriber 14. Independent of the sender, the receiver preferably removes all information about the peer. The message contains the session handle. Either the subscriber or the server preferably sends this message in response to an update message or acknowledgement message for which the session handle is not recognized.

Figure 12:
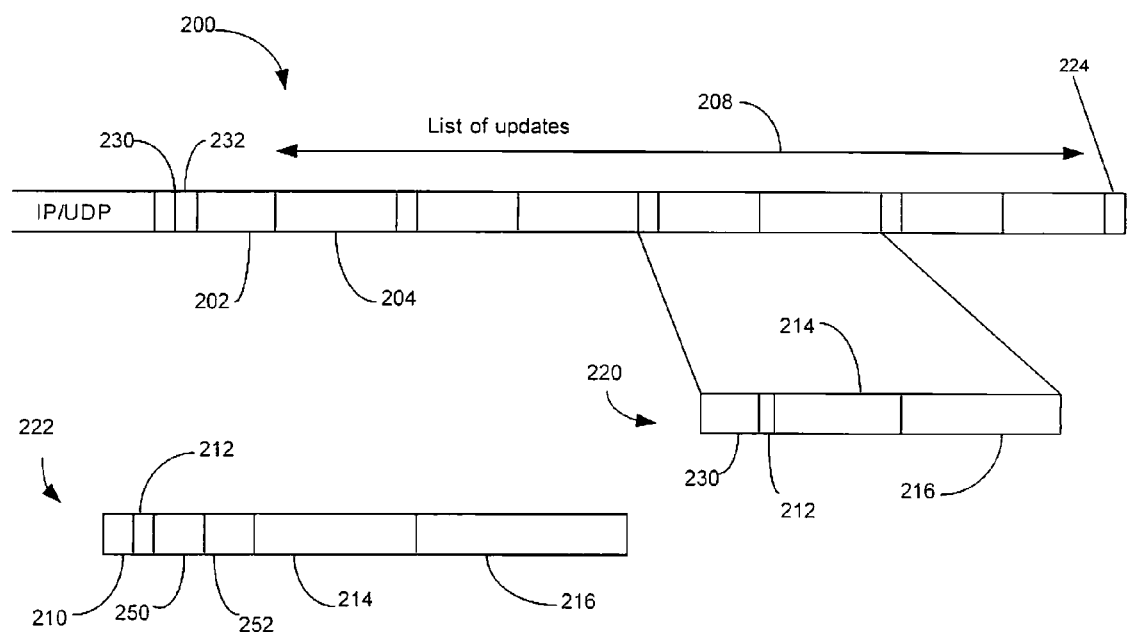
FIG. 12 is a diagram illustrating an update message.

FIG. 12 is a diagram illustrating an update message 200. The update message 200 includes a session handle 202, an update sequence number 204, a complete flag (not shown), and a list of update entries 208. Each update message contains an update sequence number (an unsigned integer) that is stepped by one for each new update. The complete flag is set by the server if, at the generation (or regeneration) of the message, the last update of this message corresponds to the right-most data LE of the linked list. The flag is useful for debugging. The list of update entries contains zero or more update entries, but is always terminated by a null entry 224. An update entry consists of a type field 210, a delete flag 212, a key field 214, an optional (if not a delete entry) data field 216, a key length entry 250 and a data length entry 252.

In one embodiment, the size entries may be a fixed entry 220 or a variable entry 222. The type of the entry determines the exact format of each update entry. Both the server and the subscriber must know the format of each used entry type. For a specific entry type, both the server and the subscriber must know whether the entry is fixed size or variable size and what is carried in those entries. If an entry has a delete flag 212 set, the corresponding entry of the subscriber database is preferably removed. In the case of a delete, it is not necessary to transfer the data field or a data length field 252. One type value is reserved for the list terminating null entry 224. If the server needs to retransmit an update message, the server uses the same update sequence number as in the original update message. However, if a data entry that was part of the original update message has been updated (and thus moved in the linked list), the data entry is not a part of the retransmitted message.

An acknowledgement message preferably contains three fields: session handle; acknowledged sequence number (ASN); and a received Updates Bitmap. The session handle preferably is assigned by the server via a connection setup message. The ASN signals to the server that all update messages up until the one with the ASN have been received.

The received updates bitmap consisting of a list (r1, r2, r3, ... rN-1, rN) of Booleans, informs the server 12 of what additional update messages that have been received. The bitmap is intended to avoid unnecessary retransmissions of messages from the server. However, the subscriber is not required to cache the corresponding messages indefinitely, so the server must be prepared to re-send a message regardless of what has been communicated in previous received update bitmaps.

The server 12 is responsible for handling a plurality of tasks and events, such as received message events active sessions, ready sessions, and expired dormant sessions. The priority of these tasks and events is up to the algorithm.

An acknowledgement message is processed by locating a session with the session handle. If no session can be located, the session is terminated with a TERMINATE SESSION action. The message source is verified. If the message source is incorrect a TERMINATE SESSION action is conducted. If the session is in the DORMANT state then the session sequence number (SSN) is set to the acknowledged sequence number (ASN). In addition, the resent offset is set to '0'. The session is set to the ready state (READY state [DONE]). If the ASN is less than the SSN, the message is ignored ([DONE]). If the ASN is larger than any pending update to the subscriber, then the session is terminated (e.g., a TERMINATE SESSION action is conducted). The received update bitmap of the message is copied to the session. The SSN is set to the value of the ASN and the corresponding LEs associated with the acknowledged updates are removed. The resend offset is reduced by the number of acknowledged updates, but stopped at zero. The session is then set to the active state (e.g., in the ACTIVE state [DONE]). A session is terminated (TERMINATE SESSION) by generating a disconnect message to the sender of message.

For a "Received Connection Request Message" event, the session is located with the specified handle. If the session is found, the message source is verified and, if correct, removed from the current session. Next, a new session is created and a setup message is sent to the subscriber 14.

For a "Received Disconnect Message" event, the session is located with the session handle. If the session is not found, the message is ignored. If the correct session is found, the message source is then verified. If the message source is incorrect, the message is ignored. The session and all associated resources are then removed.

If the time since the previous acknowledgement was received exceeds a specified time period (e.g., expired waiting period), the session is placed in the dormant state. If the time does not exceed the specified time period, the resend offset is set to '1', the first update message is resent and the session state is set to active.

For the processing of ready sessions, if limits on the number of sessions in either the active or wait state are allowed, a check is performed on if this limit has been reached. If the limit has been reached, no sessions are serviced in the ready state. With one session at a time, an update message is then generated to the subscriber 14. If the maximum pending messages value is "1" the session is placed in a waiting state. If the maximum pending message value is not "1", the session is placed in the active state.

For the processing of active sessions, if the resend offset is not zero, then the received bitmap for the next update message is searched and resent. If the number of pending update messages is greater or equal to the maximum pending messages, then a configured "time out" on the session is set and the session is placed in the wait state. A new update message is then created and sent to the subscriber. If there are no more updates to send to the subscriber, but there are update messages pending, a configured "time out" is set on the session. The session is then placed in the wait state. If there are no updates for the subscriber and no pending updates to be made, the session is placed in the idle state.

A periodic check for expired sessions in the dormant state is conducted. For each session found, an empty update message is generated to the subscriber without incrementing the sequence number. The session remains in the dormant state, but the time is moved when the session will expire next. If the subscriber replies, the session is moved out of the dormant state. The task of timing out dormant sessions on the server is optional. The complexity of the subscriber is much lower than that of the server 12. This is partly due to that the subscriber generally only handles one session, while the server might maintain a large number of sessions.

The subscriber needs specific information about the server and the session. Specifically, the information includes, the state of the session (e.g., the session can be up or down), server information (used for sending messages to the server but may also be used for message verification), session handle (e.g., a value passed from the server at session setup), an acknowledged sequence number (ASN), and an optional update message cache (i.e., a message store that can keep a set of messages in case they arrive out of order). If the update message cache is utilized, the messages in this cache must have a limited life span that is short enough to guarantee that the session never goes dormant on the server while there is still a message cached on the subscriber.

Unlike the server database, there is no requirement for the subscriber to utilize a linked list. However, in a similar fashion as the server database, the subscriber database consists of independent entries that can be located via their key.

During setup, information may be stored about the session, such as a server IP address and port number (in the case of UDP/IP), session handle, and sequence number. In addition, the session is set in an "UP" state. For a disconnect message, the session handle is verified. A source verification may also be optionally performed. If either verification fails, the message is ignored. If the message is verified, the session state is set to "DOWN" state.

When the subscriber 14 receives an update message from the server, the following steps are preferably performed. First, the session handle is verified. In addition a source verification may be optionally performed. If either verification check fails, a disconnect message is generated to the source of the update message. Next, the update sequence number (USN) is checked to determine if the USN is one more than the acknowledged sequence number (ASN). If the USN is not one more than the ASN, the message is stored in the cache (e.g. STORE IN CACHE). Next, the message is processed. Specifically, the list of update entries is processed and updates are made to the local database. The ASN is incremented by one "1". The update message is checked to determine if the USN is equal to (ASN+1) in the update message cache. If so, the message is removed from the cache and the message is processed. If the USN is not equal to ASN+1, an acknowledgment is generated (e.g., GENERATE ACKNOWLEDGEMENT performed). The message is then stored in the cache. If there is already a message with the same USN the message is replaced with the most recently received message. Next, an acknowledgement message is generated and sent to the server.

In one embodiment, only acknowledgements are sent upon receiving update messages, thereby leaving the responsibility of retransmissions to the server. In another embodiment, acknowledgement messages are periodically sent to the server, thus, in a sense polling the server for updates.

Problems arise when an entry must be removed from the server database. The problem is that the server 12 must ensure that all subscribers are informed about the removal before the entry can be removed from the server. If an entry is to be removed from the server database, it cannot be directly removed. Rather, the entry must first be marked for deletion. The container part of the data entry may be removed at this time, but the key part must not be removed because it is needed when updating the subscribers about the deletion. While an entry is marked to be deleted, it may be "recreated." Specifically, the entry may again be assigned information to its container part and no longer deleted from the subscriber's databases. In this operation, the data LE is moved just as if the data entry had been updated. The subscribers then receive the updated entry.

The server database may be updated after the entry has been marked for deletion. A pointer to the left-most marker LE in the linked list is maintained. The left-most marker is known as the tail LE and the associated pointer is known as the tail pointer. The tail LE is a marker LE which might be shared with any number of sessions. At setup or restart of a session, the tail pointer is moved to point at the session's marker LE. At initialization, the tail pointer is set to null. At any point (but preferably after processing acknowledgement messages), the server may check to see if it can move the tail pointer thereby potentially cleaning up deleted database entries. The check is simply whether the reference counter of the tail LE is "1". If the reference counter of the tail LE is "1", the linked list is parsed one LE at a time in the right direction (opposite to left direction). The parsing stops at the next marker LE to which the tail pointer is moved. Any data LE along the way pointing to a data entry marked for deletion leads to the data entry and the data LE to be removed.

The protocol of the present invention scales well to the number of subscribers because each subscriber session requires relatively few resources for maintaining its state. The protocol is robust against high packet loss and also supports long durations of disconnectivity. An advantage of the protocol of the present invention is that updates may be made to the server database at the same time as subscribers are being updated. In addition, subscribers may be added at any time without any disruption to the sessions already established.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates all modifications that fall within the scope of the invention defined by the following claims.

What is claimed:

1. A system for updating a subscriber, the system comprising:
   a server; and
   a database coupled to the server;
      wherein the database has a plurality of link elements organized into a linked list;
      the plurality of link elements having:
   a plurality of data link elements associated with data entries;
   at least one marker link element not associated with any data entry;
   at least one subscriber communicating with the server;
   at least one auxiliary link element, not organized within the linked list, for linking at least two marker link elements to regenerate an update message lost in transit;
      wherein the server has:
   means for stepping through the plurality of link elements for updated entries;
   means for determining if each stepped link element is a data link element;
   means for formatting updated data associated with the data link element and appending the formatted data to an update message;
      wherein the update message, at a specified time, is sent to the subscriber being currently serviced by the server and a marker link element, comprising a left pointer, a right pointer and a reference counter, is inserted at a specified position in the linked list to indicate update of the linked list.

2. The system for updating a subscriber of claim 1 wherein the specified time for sending the update message occurs when a session between the server and the subscriber is in an active or ready state.

3. The system for updating a subscriber of claim 1 wherein the specified time for sending the update message occurs when the message exceeds a specified size.

4. The system for updating a subscriber of claim 1 wherein the subscriber communicates with the server via a datagram transport medium.

5. The system for updating a subscriber of claim 4 wherein the datagram transport medium utilizes a User datagram protocol (UDP).

6. The system for updating a subscriber of claim 1 wherein the data entries transition through a plurality of states.

7. The system for updating a subscriber of claim 1 wherein the linked list is configured from left to right and the server steps through the linked list left to right.

8. The system for updating a subscriber of claim 7 wherein the linked elements include two fixed end link elements located on each side of the linked list, the fixed end link elements not associated with any data entry.

9. The system for updating a subscriber of claim 7 wherein the specified time to send the update message occurs when the server steps to a right fixed end marker.

10. The system for updating a subscriber of claim 1 wherein each data link element has at least one pointer pointing to an adjacent link element and an object pointer pointing to a database entry.

11. The system for updating a subscriber of claim 1 wherein the data link element includes a data entry type field specifying a type of database object.

12. The system for updating a subscriber of claim 1 wherein the subscriber provides a session entry associated with at least one marker link element.

13. The system for updating a subscriber of claim 1 wherein the server includes means for retransmitting a sent update message if no acknowledgement is received from the subscriber.

14. The system for updating a subscriber of claim 1 wherein the server includes means for organizing a plurality of sessions into a linked list.

15. A method of updating a subscriber communicating with a server, the server associated with a database storing a plurality of data entries, the method comprising the steps of:
   organizing the database into a linked list having a plurality of link elements, wherein the plurality of link elements includes a plurality of data link elements associated with data entries, at least one marker link element not associated with any data entry, and at least one auxiliary link element, not organized within the linked list, for linking at least two marker link elements to regenerate an update message lost in transit;
   stepping through the linked list by the server for updated entries;
   determining if each stepped link element is a data link element;
   formatting any updated data associated with the determined data link element and appending the formatted data into an update message;
   sending the update message, at a specified time, to the subscriber being currently serviced by the server; and
   inserting a marker link element, comprising a left pointer, a right pointer and a reference counter, at a specified position in the linked list to indicate update of the linked list.

16. The method of updating the subscriber of claim 15 wherein the specified time for sending the update message occurs when the server completely steps through the linked list.

17. The method of updating the subscriber of claim 15 wherein the specified time for sending the update message occurs when the message exceeds a specified size.

18. The method of updating the subscriber of claim 15 wherein the linked list is configured from left to right and the server steps through the linked list left to right.

19. The method of updating the subscriber of claim 18 wherein the linked elements include two fixed end link elements located on each side of the linked list, the fixed end link elements not associated with any data entry.

20. The method of updating the subscriber of claim 15 further comprising the step of retransmitting the update message if no acknowledgement is received from the subscriber.

21. The method of updating the subscriber of claim 15 further comprising the step of organizing a plurality of sessions into a linked list.

* * * * *

UNITED STATES PATENT AND TRADEMARK OFFICE
CERTIFICATE OF CORRECTION

PATENT NO.       : 7,966,295 B2
APPLICATION NO.  : 11/869821
DATED            : June 21, 2011
INVENTOR(S)      : Karlsson It is certified that error appears in the above-identified patent and that said Letters Patent is hereby corrected as shown below:

On the Title Page, in Field (73), under "Assignee", in Column 1, Line 1, delete "Teefonaktiebolaget" and insert -- Telefonaktiebolaget --, therefor.

In Column 3, Line 41, delete "e.g." and insert -- e.g., --, therefor.

In Column 6, Line 47, delete "addition" and insert -- addition, --, therefor.

In Column 6, Line 51, delete "However" and insert -- However, --, therefor.

In Column 6, Line 55, delete "embodiment" and insert -- embodiment, --, therefor.

In Column 6, Line 56, delete "specified" and insert -- specified, --, therefor.

In Column 7, Line 17, delete "ms)" and insert -- ms), --, therefor.

In Column 7, Line 23, delete "list" and insert -- list, --, therefor.

In Column 7, Line 31, delete "state" and insert -- state, --, therefor.

In Column 7, Line 64, delete "embodiment" and insert -- embodiment, --, therefor.

In Column 8, Lines 3-4, delete "sessions" and insert -- sessions, --, therefor.

In Column 8, Line 5, delete "session)" and insert -- session), --, therefor.

In Column 8, Line 19, delete "104" and insert -- 104, --, therefor.

In Column 8, Line 19, delete "106" and insert -- 106, --, therefor.

In Column 9, Line 29, delete "bitmap" and insert -- bitmap, --, therefor.

In Column 9, Line 39, delete "events" and insert -- events, --, therefor.

Signed and Sealed this
Eighteenth Day of October, 2011

David J. Kappos
*Director of the United States Patent and Trademark Office*

CERTIFICATE OF CORRECTION (continued)
U.S. Pat. No. 7,966,295 B2

In Column 9, Line 46, delete "incorrect" and insert -- incorrect, --, therefor.

In Column 9, Line 47, delete "state" and insert -- state, --, therefor.

In Column 10, Line 12, delete "resent" and insert -- resent, --, therefor.

In Column 10, Line 20, delete ""1"" and insert -- "1", --, therefor.

In Column 11, Line 6, delete "addition" and insert -- addition, --, therefor.

In Column 11, Line 13, delete "e.g." and insert -- e.g., --, therefor.

In Column 11, Line 22, delete "USN" and insert -- USN, --, therefor.

In Column 11, Line 56, delete "pointer" and insert -- pointer, --, therefor.